(12) United States Patent
Andreasson et al.

(10) Patent No.: US 8,369,310 B2
(45) Date of Patent: *Feb. 5, 2013

(54) METHOD FOR RELIABLE DETECTION OF THE STATUS OF AN RTP PACKET STREAM

(75) Inventors: Henrik Andreasson, Tyreso (SE); Henrik Grunell, Enskede (SE)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,034

(22) Filed: Jul. 13, 2011

(65) Prior Publication Data

US 2012/0014276 A1    Jan. 19, 2012

Related U.S. Application Data

(60) Provisional application No. 61/364,311, filed on Jul. 14, 2010.

(30) Foreign Application Priority Data

Jul. 14, 2010   (EP) .................................... 10169564

(51) Int. Cl.
*H04L 12/28* (2006.01)
*H04L 12/66* (2006.01)

(52) U.S. Cl. ......... 370/351; 370/356; 370/389; 370/390

(58) Field of Classification Search ................ 370/351, 370/356, 389, 390
See application file for complete search history.

(56) References Cited

U.S. PATENT DOCUMENTS

| | | | |
|---|---|---|---|
| 6,917,587 B1 | 7/2005 | Sarkar et al. | |
| 2005/0002400 A1 | 1/2005 | Karol et al. | |
| 2005/0227657 A1* | 10/2005 | Frankkila et al. | 455/255 |
| 2006/0126604 A1* | 6/2006 | Kim | 370/356 |
| 2007/0041324 A1* | 2/2007 | Shenoi | 370/235 |
| 2007/0274284 A1* | 11/2007 | Dendukuri et al. | 370/351 |
| 2008/0151791 A1* | 6/2008 | LeBlanc | 370/291 |
| 2008/0151921 A1 | 6/2008 | Gentle et al. | |
| 2008/0175276 A1 | 7/2008 | Lakaniemi et al. | |
| 2009/0016333 A1 | 1/2009 | Wang et al. | |
| 2009/0109881 A1 | 4/2009 | Li et al. | |
| 2009/0132244 A1 | 5/2009 | Zinser, Jr. et al. | |
| 2009/0328048 A1* | 12/2009 | Khan et al. | 718/102 |

FOREIGN PATENT DOCUMENTS

EP    1 626 591 A1    2/2006

OTHER PUBLICATIONS

PCT International Search Report dated Nov. 16, 2011 for International Application No. PCT/US 11/43858.
PCT Notification of Transmittal of the International Search Report and the Written Opinion dated Nov. 16, 2011 for International Application No. PCT/US 11/43858.
PCT Written Opinion of the International Searching Authority dated Nov. 16, 2011 for Internation Application No. PCT/US 11/43858.

* cited by examiner

*Primary Examiner* — Brandon Renner
(74) *Attorney, Agent, or Firm* — Birch, Stewart, Kolasch & Birch, LLP

(57) ABSTRACT

In a method for determining the status of a real-time transfer protocol (RTP) packet stream, several steps are performed. A time period elapsed since reception of the last RTP packet is determined, the content of the last received RTP packet is determined, and the status of the RTP packet stream based on the elapsed time period and the content of the last received RTP packet is categorized. The method is advantageous in that the risk of false detection of dead RTP packet streams is reduced.

35 Claims, 2 Drawing Sheets

METHOD FOR RELIABLE DETECTION OF THE STATUS OF AN RTP PACKET STREAM

This application claims priority of U.S. Provisional Application No. 61/364,311 and of European Application No. 10169564.1, both filed Jul. 14, 2010. The entire contents of each are incorporated herein by reference The present disclosure relates to the field of Voice over Internet protocols. In particular, the present disclosure relates to a method of determining the status of a real time transfer protocol (RTP) packet stream.

BACKGROUND

For communication in packet switched networks, such as the Internet, data packets are transferred via the network from a sending end, e.g. a transmitter comprising an audio source and an encoder, to a receiving end, e.g. a receiver comprising a decoder. The flow of data packets sent from the sending end to the receiving end over the packet switched networks is referred to as the data packet stream. In the following, the data packets sent from the sending end (or encoder) may also be referred to as codec data packets. The real time transfer protocol (RTP) is generally used to send multimedia data, such as e.g. audio data, and is usually used in conjunction with the Real time transport control protocol (RTCP), wherein RTP is used to transfer the audio data and RTCP is used to periodically send control information, quality of service parameters and/or transmission statistics.

Generally, during voice over internet protocol (VoIP) applications, such as a VoIP audio conversation based on RTP packet streams, it is desirable to be able to detect if the packet stream is alive (i.e. if the RTP packet is indeed received at the remote side or receiver), or dead (i.e. if the RTP packet is not received at the remote side or receiver).

A packet stream can die for several reasons, such as a general problem in network transmission (no route exists to the destination due to router failure or router overloading), a loss in connection of a mobile device involved in the communication to a Wi-Fi or 3G network, a sudden introduction of an extreme delay (typically several seconds) in a 3G network connection, a corruption of a signaling protocol (e.g. session initiation protocol, SIP) wherein a packet transmission is stopped but the receiving end has not been notified, a policy change from a firewall thereby stopping a packet data stream from passing through, and a failure of a relay server in forwarding the data packets.

Detection of such situations, or more generally of a dead RTP packet stream, is desirable in order to improve the user experience in VoIP audio conversation. On the other hand, information about a dead connection usually requires some sort of action by the user, such as for example to check the connection using another channel (e.g. via RTCP) or, even more drastically, to restart a complete session. Thus, it is desirable that the determination of the status of an RTP packet stream (i.e. whether the RTP packet stream is dead or alive) is reliable and, in particular, that the number of invalid or false notifications to the user of a dead RTP packet stream is reduced.

Thus, there is a need for providing methods and devices that would overcome, or at least alleviate or mitigate, some of the above mentioned issues.

SUMMARY

It is with respect to the above considerations that the present invention has been made.

Further, the inventors have also realized that if voice activity detection (VAD) and discontinuous transmission (DTX) with comfort noise (CN) is utilized to reduce the bandwidth usage during silence periods, the packet transmission scheme may become more complicated and the risk for false detection of a dead RTP packet stream increases.

VAD is a technique also known as speech activity detection and is used in speech processing for detecting the presence or absence of human speech during an audio session. VAD is advantageous in that it prevents unnecessary coding and transmission of silence packets in VoIP applications. VAD may be used in combination with DTX, which is a method of periodically stopping transmission of data (e.g. by momentarily powering-down or muting a device) when there is no voice input (to the device), and/or comfort noise, which is artificial background noise generated for filling any period of silence detecting by VAD during an audio session.

Generally, codec packets are sent with a certain payload type while comfort noise (CN) packets are sent with another payload type. However, some codecs or encoders having a built-in VAD/DTX/CN functionality may send CN data within a codec packet, i.e. within a packet having the same payload type as that of a codec packet comprising e.g. speech data. In other words, the data packets may be a codec packet with speech data, a codec packet with CN data or a CN packet with CN data.

Normally, data packets with speech data are transmitted every 10 to 60 milliseconds. However, CN data may be sent at any time interval. Thus, the RTP packet data stream may appear dead while there is in fact only a very long time interval between transmission of CN data, thereby rendering the determination of whether an RTP packet stream is dead even more difficult.

An object of the present invention is therefore to provide a reliable method and receiver for determining the status of an RTP packet stream.

More specifically, it is an object of the present invention to provide a method of determining the status of an RTP packet stream which reduces the risk of false detection of dead RTP packet streams.

This and other objects of the present invention are achieved by means of a method and a receiver having the features defined in the independent claims. Preferable embodiments of the invention are characterized by the dependent claims.

Hence, according to a first aspect of the present invention, a method of determining the status of an RTP packet stream is provided. The method comprises the steps of determining a time period elapsed since reception of the last RTP packet and determining the content of the last received RTP packet. Further, the method comprises the step of, based on the elapsed time period and the content of the last received RTP packet, categorizing the status of the RTP packet stream.

According to a second aspect of the present invention, a receiver comprising a processor (or processing means) for determining the status of an RTP packet stream is provided. The processor is configured to determine a time period elapsed since reception of the last RTP packet, determine the content of the last received RTP packet and categorize the status of the RTP packet stream based on the elapsed time period and the content of the last received RTP packet.

The present invention makes use of an understanding that the status of an RTP packet stream can be determined based on a time period elapsed since reception of the last RTP packet and on the content of the last received RTP packet. With the present invention, for determining whether the RTP packet stream is dead, it is both checked if the last RTP data packet has been received within a certain time in history and if the content of the last RTP packet reveals if the packet data stream is dead. The present invention is advantageous in that the combination of these two indicators provide a reliable method and receiver for determining the status of the RTP packet stream.

Further, the present invention is advantageous in that it reduces the risk of categorizing an RTP packet stream as dead during silence periods in combination with VAD/DTX schemes, where silence can result in long transmission gaps without the RTP packet stream actually being dead.

More generally, the present invention is advantageous in that it provides a method and a receiver for detecting a dead RTP packet stream during a silence period with long transmission gap.

According to an embodiment, the steps of the above described method may form a sequence performed at regular time intervals. Advantageously, the time interval is selected to be sufficiently short such that a connection can be restarted with a short (preferably minimum) interruption time for the user or call participant and sufficiently long for reducing unnecessary excessive processing power consumption.

In particular, the method may be implemented such that it comprises an initial step of waiting for a predetermined period of time before the above mentioned steps or actions for determination of the status of the RTP packet stream are carried out. The period of time may be in the order of 1000 milliseconds.

It will be appreciated that, although the steps of the method or the actions taken by the processor of the receiver may be performed at regular time intervals, the present invention may also be implemented on the basis of a randomly generated time interval.

According to an embodiment, the status of the RTP packet stream may be categorized as dead if, based on the last received RTP packet, an output from a jitter buffer of the receiver comprises CN data generated by the jitter buffer. This particular embodiment is advantageous in that the RTP packet stream is categorized as dead if a jitter buffer of the receiver outputs synthetic data (e.g. generated by packet loss concealment, PLC), which usually indicates presence of a long period of silence, thereby indicating a risk that the RTP packet stream is dead.

According to another embodiment, the RTP packet stream may be categorized as alive if the content of the last received RTP packet comprises speech data, if the content of the last received RTP packet comprises comfort noise data generated at an encoder or if an output of a jitter buffer of the receiver does not comprise CN data generated by the jitter buffer.

Further, the RTP packet stream is categorized as alive if the elapsed time period is shorter than the time interval. In other words, if an RTP packet has been received since last sequence, the RTP packet stream is categorized as alive.

Although the present invention is advantageous in that it reduces the risk of false detection of an RTP packet stream as dead, it is also beneficial to clearly identify the conditions for which the RTP packet stream can be categorized as alive in order to reduce any further processing and thereby reduce processing power consumption. Further, it will be appreciated that fulfillment of a condition for categorizing the RTP packet stream as alive does not necessarily mean that the fulfillment of the opposite condition enables categorizing the RTP packet as dead. In particular, the RTP packet stream is not necessarily dead if the elapsed time since reception of the last RTP packet is longer than the time interval. The present invention provides for further determination, in particular of the content of the last RTP packet, such that categorization of an RTP packet stream as dead is more reliable.

According to an embodiment, the method may further comprise the step of determining if an RTP control protocol (RTCP) packet has been received within a predetermined period of time. This additional step is advantageous in that it further improves the reliability of the method in detecting a dead RTP packet stream and in particular for determining that the RTP packet stream is dead during a silence period.

More specifically, the RTP packet stream may be categorized as dead on a condition that no RTCP packet has been received within the predetermined period of time and the elapsed time exceeds the time interval. Advantageously, the predetermined period of time is selected such that it is as short as possible in order to be able to quickly detect a dead RTP packet stream and long enough in order to reduce the risk of false detection of a dead packet stream. Normally, the predetermined period of time is longer than the time interval set for the above mentioned sequence of steps or actions.

According to an embodiment, the method may further comprise the step of determining whether the payload size of the last received RTP packet exceeds a predetermined threshold, which is advantageous in that a further parameter is introduced for categorizing the status of the RTP packet stream, thereby improving even more the reliability of the method. In particular, the status of the RTP packet stream may be categorized as dead if the payload size of the last received RTP packet exceeds the predetermined threshold and the elapsed time exceeds the time interval.

Advantageously, for reducing even more unnecessary processing power consumption, the step of determining whether the payload size of the last received RTP packet exceeds a predetermined threshold is performed on a condition that the elapsed time exceeds the time interval and a RTCP packet has been received within a predetermined period of time.

An RTP packet generally comprises a fixed header (with a size of at least 12 bytes) and the actual payload (e.g. compressed voice/speech data or comfort noise generator, CNG, filter coefficients). In the present application, reference to the payload size of the RTP packet refers to the size of the actual payload of the RTP packet. It will be appreciated that the size of the complete RTP packet is equal to the sum of the size of the fixed header and the size of the payload.

In one embodiment, the predetermined threshold may for example be 10 bytes since a (codec or CN) packet containing CN data is normally always less than 10 bytes. In other words, if the payload size of the last RTP packet is 10 bytes or larger, then it means that the last RTP packet contained speech data. Thus, if the payload size of the last RTP packet is 10 bytes or larger and the elapsed time exceeds the time interval, then the RTP packet stream is dead (e.g. a voice session has been interrupted). It is then unnecessary of further analyzing the content of the last RTP packet. The step of determining whether the size of the last received RTP packet exceeds a predetermined threshold may therefore advantageously be performed before determining the content of the last received RTP packet.

On the other hand, if the payload size of the last RTP packet is less than 10 bytes, then the last RTP packet may include speech or CN data. Thus, if, in addition to the payload size of the last RTP packet being less than 10 bytes, the elapsed time exceeds the time interval, the categorization of the status of the RTP packet stream is based on the content of the last RTP packet.

The present invention is also directed to a computer readable medium, e.g. a non-transitory computer readable medium, having computer executable instructions for carrying out each of the steps of the method as described in any one of the preceding embodiments.

Effects and features of the receiver according to the second aspect of the present invention and its embodiments are largely analogous to those described above in connection with the method according to the first aspect of the present invention. It will be appreciated that the different features in embodiments described with reference to the method according to the first aspect of the invention can be combined with the receiver according to the second aspect of the invention and, vice versa, to create embodiments other than those described herein.

For example, the processor or processing means of the receiver may be configured to perform the determination of the elapsed period of time, the determination of the content of the last received RTP packet and the categorization of the status of the RTP packet in a sequence performed at regular time intervals. For this purpose, the receiver or the processor of the receiver may be equipped with a clock or a synchronous means for synchronizing the actions (determinations and categorization) of the receiver. The processor of the receiver may also be configured to categorize the status of the RTP packet stream as dead if, based on the last received RTP packet, an output from a jitter buffer of the receiver comprises CN data generated by the jitter buffer. The processor may also be configured to categorize the status of the RTP packet stream as alive if the content of the last received RTP packet comprises speech data, if the content of the last received RTP packet comprises comfort noise generated at an encoder, if an output of a jitter buffer of the receiver does not comprise CN data generated by the jitter buffer, or if the elapsed time period is shorter than the time interval.

Further, the processor may be configured to determine if an RTCP packet has been received within a predetermined period of time. In particular, the processor of the receiver may be configured to categorize the RTP packet stream as dead on a condition that no RTCP packet has been received within the predetermined period of time and the elapsed time exceeds the time interval.

Further, the processor may be configured to determine whether the payload size of the last received RTP packet exceeds a predetermined threshold, in particular if the elapsed time exceeds the time interval and a RTCP packet has been received within the predetermined period of time. In this case, the processor may be configured to categorize the status of the RTP packet stream as dead if the payload size of the last received RTP packet exceeds the predetermined threshold.

Further objectives of, features of, and advantages with, the present invention will become apparent when studying the following detailed disclosure, the drawings and the appended claims. It will be appreciated that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic and generally only show parts which are necessary in order to elucidate the invention, wherein other parts may be omitted or merely suggested.

DETAILED DESCRIPTION

Figure 1:
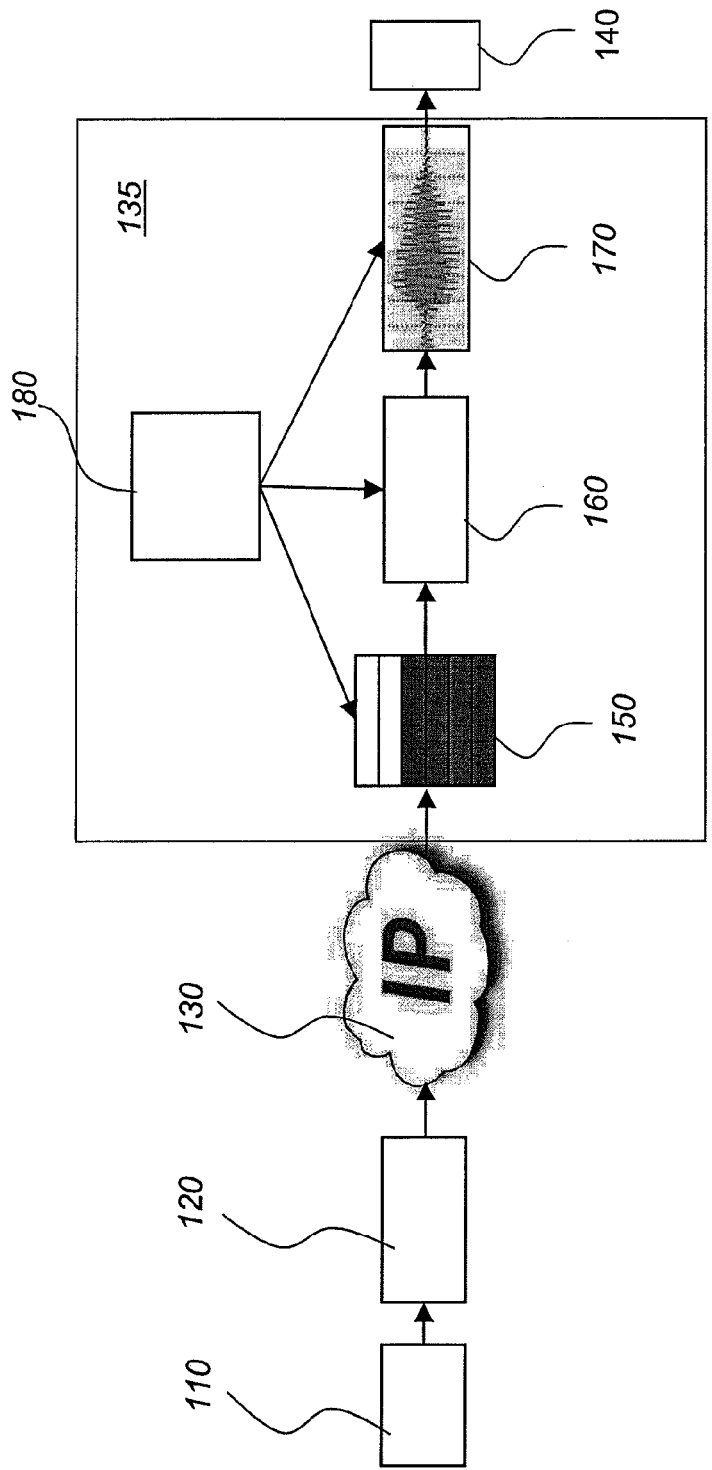
FIG. 1 schematically shows an exemplified system in which a receiver in accordance with an embodiment of the invention is included and configured to operate.

With reference to FIG. 1, an exemplified system is shown in which a receiver 135 in accordance with an embodiment of the invention is included and configured to operate. The transmitting or sending end includes an audio source 110 and an encoder 120 for encoding and packetizing an audio signal for transmission as packet data over a packet data network 130, here indicated as an Internet Protocol network. In such a system, the audio signal, e.g. a sound wave, may be picked up by a microphone and transduced into an analog electronic signal, which is further sampled by an A/D converter to result in a sampled signal. The sampled signal is the input of the encoder 120.

The receiving end includes a receiver 135 and an audio destination 140. The receiver 135 may include a jitter or de-jitter buffer 150, a decoder 160 and a processor or processing means 180. The processor 180 exchanges signaling information with the jitter buffer 150 and is also responsible for signaling to the decoder 160 and any additional audio buffer 170. In other words, the processor 180 is operatively connected to the jitter buffer 150, the decoder 160 and any additional audio buffer 170.

A jitter or de-jitter buffer is generally used to counter jitter (delay) introduced by queuing in packet switched networks such that a continuous playout of audio data transmitted over the network can be ensured at the audio destination 140. Indeed, in packet switched networks, such as the Internet, data packets transferred by the network are subject to varying delays due to network load when transferring a packet, network path for a transferred packet, and other network conditions. Thus, data packets that are produced by a transmitter at a constant rate arrive at a receiver with variable delays. The varying delay of a data packet is mainly due to the delay inflicted by the packet network and is often referred to as jitter.

The jitter buffer 150 is configured to de-jitter the incoming stream of packets and provide a constant flow of data to the decoder 160, preferably at the same constant rate with which they were sent in order to reproduce an audio stream that is true to the original.

The decoder 160 is at least in part controlled by the processing means 180. For example, the decoder 160 itself and its operations may be equivalent to that described in EP1243090.

The receiver 135 at the receiving end is configured to receive data packets with digitized signal samples from the packet data network 130. Received data packets are normally inserted in the jitter buffer 150.

The processor or processing means 180 is then configured to categorize the status of the RTP packet stream based on a determination of an elapsed time since reception of the last RTP packet and a determination of the content of the last received RTP packet.

Figure 2:
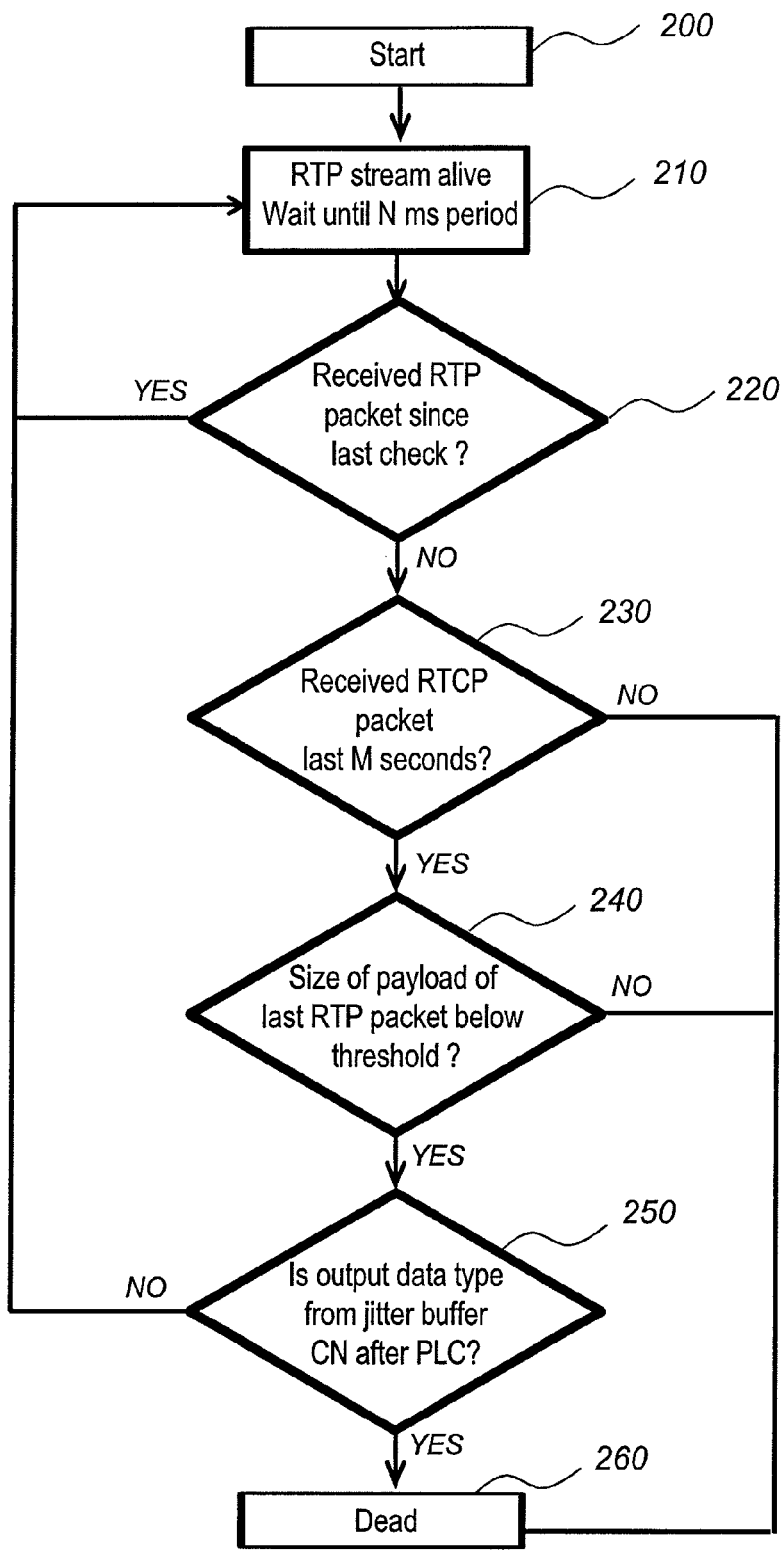
FIG. 2 is a flow chart for the operation of the processor of the receiver shown in FIG. 1 in accordance with an embodiment of the invention.

With reference to the flow chart in FIG. 2, the operation of the receiver 135 in FIG. 1, and in particular the processor or processing means 180, will now be described in accordance with an exemplifying embodiment of the present invention.

Initially or by default, in step 200, the RTP packet stream is considered alive. Optionally, in step 210, the processor 180 of the receiver 135 may be configured to wait for a period of N milliseconds before performing the next steps (or actions)

such that the determination of the status of the RTP packet stream is performed on the basis of regular time intervals.

In other words, although not necessary, the steps of the method may form a sequence of actions repeated at a regular time interval during an active session. Indeed, the processor 180 may be configured to return to step 210 as long as the RTP packet stream is determined to be alive. As a result, a new processing loop is started every N milliseconds.

The time interval N may be selected to be about 1000 milliseconds (1 second). Advantageously, the value of N is selected such that a connection can be restarted with a short interruption time and such that unnecessary excessive processing power consumption is reduced or avoided.

In step 220, the processor 180 is configured to determine a time period elapsed since reception of the last RTP packet. In other words, the processor 180 is configured to determine whether an RTP packet has been received since the last time a check was made, i.e. since last sequence. For this purpose, the receiver may be equipped with a clock or some kind of timing means. For example, the processor 180 may log the arrival time of a received RTP packet such that the elapsed time is the difference between the current time (i.e. when the determination of the status of the RTP packet stream is made) and the arrival time of the last RTP packet.

If the elapsed time is less than the time interval, i.e. if an RTP packet has been received since last check or last sequence, the RTP packet stream is categorized as alive. The processor may then be configured to return to step 210. During a stream without VAD/DTX/CN that is alive, the execution flow may then switch between steps 220 and 210. However, in order to handle silence periods under a VAD/DTX/CN scheme, further logic is advantageous, which is explained in more detail below.

In step 230, if it is determined that the elapsed time exceeds the time interval, i.e. if it is determined that no RTP packet was received since last check, the processor is configured to determine if an RTCP packet has been received during a predetermined period of time, i.e. during the last M seconds.

As mentioned above, an RTCP packet generally comprises control information, quality of service parameters and/or transmission statistics. RTCP packets are generally send periodically and less often than RTP packets during an active audio session. In general, the interval between reception of RTCP packets is uniformly distributed between 2.5 and 7.5 seconds with an average of about 5 seconds. Thus, the predetermined period of time, i.e. M, is selected such that it is sufficiently short (preferably as short as possible) in order to be able to detect a dead stream quickly (preferably as soon as possible) and sufficiently long in order to cover a long (preferably the longest possible) interval taking into account the network latency and a margin for reducing, and preferably avoiding, the risk of false detections of a dead RTP packet stream. In this respect, the predetermined period of time M may for example be at least 8 seconds and preferably about 12 seconds.

If no RTCP packet has been received during the predetermined period of time M, then the RTP packet stream is categorized as dead in step 260. This step is particularly advantageous for detecting a dead stream during a long silence period (in particular when steps 240 and 250 described below are unable to detect a dead stream).

Optionally, in step 240, if the elapsed time exceeds the time interval and an RTCP packet has been received during the last M seconds (the predetermined period of time), the processor 180 may be configured to determine the payload size of the last received RTP packet. In particular, the processor 180 may be configured to compare the payload size of the last received RTP packet with a predetermined threshold, e.g. 10 bytes. If the payload size of the last RTP packet is 10 bytes or larger, then the processor is configured to categorize the RTP packet stream as dead in step 260. As mentioned above, in the present application, the payload size of the RTP packet refers to the size of the actual payload of the RTP packet (i.e. without the size of the header and any other fields that the RTP packet may comprise). As a payload size being 10 bytes or larger means that the last RTP packet contained speech data, if no RTP packet has been received since last sequence, then the voice or audio session has been interrupted and the RTP packet stream is categorized as dead (step 260).

On the other hand, if the payload size of the last RTP packet is less than 10 bytes, then the last RTP packet may include speech or CN data. Thus, if, in addition to a determination that the payload size of the last RTP packet is less than 10 bytes, the elapsed time exceeds the time interval, the categorization of the status of the RTP packet stream is based on the content of the last RTP packet, which is further explained below with reference to step 250.

In step 250, the information about the data output of the jitter buffer 150 is utilized. The jitter buffer 150 may for example be one of the type described in WO2009/000821.

The principle of operation of the jitter buffer is to hold incoming packets for a period of time, thus introducing a delay at the receiver, such that future packets that are subject to larger delays will have arrived before their respective time-of-use. In other words, packets are needed in the jitter buffer to prevent the buffer from underflowing, or at least reducing the time during which the buffer is in a state of underflow.

The jitter buffer 150 may be any jitter buffer, whose general principle of operation is to take received RTP packets as input and provide audio data as output. Every block of audio data that is output from the jitter buffer is categorized with an output data type. There are four possible output data types:

(i) "Normal", wherein the output data originates from a speech data in a codec packet (this type of output data is only possible when there is speech data in the jitter buffer, thus when the RTP packet comprises speech data);

(ii) "Comfort noise generation" (CNG), wherein the output data originates from CN data in a codec or CN packet (in this case, the jitter buffer is not necessarily empty but the jitter buffer generates CN data for providing a continuous playout of audio data);

(iii) "Packet loss concealment" (PLC), wherein there is no speech data to output from the jitter buffer and the output data is created according to a PLC algorithm (in other words, the jitter buffer was empty); and (iv) "CNG after PLC", wherein after some time (much shorter than the chosen time interval N) of PLC output, the jitter buffer starts outputting CN data generated by itself, i.e. no CN data related to a received CN packet or received CN data.

Turning now to the method of the present invention and the categorization of the status of the RTP packet stream by the processor 180 of the receiver 135, if the output type is normal (indicated as (i) above), then there is still data in the jitter buffer to play out, even though no packet has arrived since the last sequence (i.e. even though the elapsed time is equal or larger than the time interval N). In this case, the status of the RTP packet stream is not categorized as dead but alive (step 210) since there is still audible speech data to be played out.

If the output type is CNG (indicated as (ii) above), then the last RTP packet contains CN data and the RTP packet stream is categorized as alive (step 210).

If the output type is PLC (indicated as (iii) above), then the jitter buffer 150 has recently run out of speech data. After some time, generally much shorter than the time interval N, the jitter buffer starts outputting automatically generated CN data, i.e. CN data generated by the jitter buffer itself. This type of output data can be treated as type (i) (normal) described above since, in this case, the CN data is generated by the jitter buffer before the next sequence (at a time shorter than N).

Finally, if the output type is CNG after PLC (indicated as (iv) above), then it has been preceded by type (iii) and (i), i.e. speech data, then the RTP packet stream is categorized as dead in step 260.

Generally, if an RTP packet stream becomes and stays dead during speech data transmission, the output data types from the jitter buffer will be first normal, PLC and then CNG after PLC and remains of the last type (i.e. CNG after PLC). If an RTP packet stream becomes and stays dead during CN data transmission, the output data type will remain of the second type, i.e. CNG.

The processor 180 may therefore be configured to categorize the RTP packet stream as alive (step 210) if the content of the last received RTP packet comprises speech data, if the content of the last received RTP packet comprises CN data generated at an encoder or if an output of a jitter buffer of the receiver does not comprise CN data generated by the jitter buffer.

The function of the processor 180 and more generally of the receiver 135 is not dependent on the specific jitter buffer 150. More generally, the jitter buffer 150 of the receiver 135 is configured to handle the incoming packets and to determine for each incoming RTP packet if it comprises speech or CN data and stores (buffers) the information internally. For each audio data block pulled from the jitter buffer 150 for play out, the processor is informed on the type of data according to the above list (i)-(iv). If there is no data to be played out in the jitter buffer when requested, a PLC mechanism is incorporated.

Although the step 240 of determining the payload size of the last RTP packet is optional, combining this step 240 with the step 250 of determining the content of the last RTP packet is advantageous in that it reduces even further the risk of false dead stream detection. In addition, executing the step 240 of determining the payload size of the last RTP packet before determining the content of the last RTP packet reduces unnecessary processing.

While specific embodiments have been described, the skilled person will understand that various modifications and alterations are conceivable within the scope as defined in the appended claims.

For example, although the steps of the method of the present invention or the actions taken by the receiver of the present invention have been described in a certain order, it is also envisaged that another order may be applied.

Further, although it is sometimes referred to the term "exceed", it is to be understood that the specific condition may also be meant to be "equal or larger than", depending on the condition to be set in the specific application.

Further, it is also envisaged that an alarm may be sent to the call participant in case a detection of a dead packet stream has occurred. Optionally, such an alarm may comprise a course of actions to be performed in order to retrieve the audio session.

The methods disclosed hereinabove may be implemented as software, firmware, hardware or a combination thereof. Certain components or all components may be implemented as software executed by a digital signal processor or microprocessor, or be implemented as hardware or as an application-specific integrated circuit. Such software may be distributed on computer readable media, which may be a non-transitory computer-readable media (i.e. all computer-readable media except for a transitory, propagating signal). Computer readable media includes computer storage media such as volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

What is claimed is:

1. A method for determining a status of a real-time transfer protocol (RTP) packet stream at a receiver, the method comprising:
   determining a time period elapsed since reception of the last RTP packet at the receiver;
   determining a payload size of the last received RTP packet;
   determining an output data type of audio data output from a jitter buffer of the receiver;
   categorizing the RTP packet stream as dead if the elapsed time period is greater than a time interval selected for determining the status of the RTP packet stream, the payload size of the last received RTP packet is below a predetermined threshold size, and the output data type is determined to be comfort noise data generated by the jitter buffer according to a packet loss concealment algorithm; and
   categorizing the RTP packet stream as alive if the elapsed time period is greater than the time interval selected for determining the status of the RTP packet stream, the payload size of the last received RTP packet is below the predetermined threshold size, and the output data type is determined to be comfort noise data generated at an encoder and received at the jitter buffer in at least one comfort noise packet.

2. The method of claim 1, wherein the step of determining the payload size of the last received RTP packet is performed only if the elapsed time period is determined to be greater than the time interval selected for determining the status of the RTP packet stream.

3. The method of claim 1, further comprising categorizing the RTP packet stream as alive if the elapsed time period is greater than the time interval selected for determining the status of the RTP packet stream, the payload size of the last received RTP packet is below the predetermined threshold size, and the output data type is determined to be speech data.

4. The method of claim 1, further comprising categorizing the RTP packet stream as alive if the elapsed time period is shorter than the selected time interval.

5. The method of claim 1, further comprising the step of determining if an RTP control protocol (RTCP) packet has been received within a predetermined period of time.

6. The method of claim 5, further comprising categorizing the RTP packet stream as dead if it is determined that no RTCP packet has been received within the predetermined period of time and the elapsed time period is greater than the selected time interval.

7. The method of claim 5, wherein said predetermined period of time is at least 8 seconds, preferably about 12 seconds.

8. The method of claim 1, wherein the predetermined threshold size is 10 bytes.

9. The method of claim 1, further comprising categorizing the RTP packet stream as dead if the elapsed time period is greater than the time interval selected for determining the status of the RTP packet stream and the payload size of the last received RTP packet exceeds the predetermined threshold size.

10. The method of claim 1, wherein the step of determining the output data type of the audio data output from the jitter buffer is performed only if the elapsed time period is determined to be greater than the time interval selected for determining the status of the RTP packet stream and the payload size of the last received RTP packet is determined to be below the predetermined threshold size.

11. The method of claim 1, wherein the time interval selected for determining the status of the RTP packet stream is about 1000 milliseconds.

12. A non-transitory computer readable medium having computer executable instructions for carrying out each of the steps of the method as claimed in claim 1.

13. A method for determining a status of a real-time transfer protocol (RTP) packet stream at a receiver, said method including the steps of:
    determining a time period elapsed since reception of the last RTP packet;
    determining a payload size of the last received RTP packet;
    receiving information about an output data type of a jitter buffer of the receiver, the output data type being based on a type of audio data contained in the last received RTP packet;
    categorizing the RTP packet stream as dead if the elapsed time period is greater than a time interval selected for determining the status of the RTP packet stream, the payload size of the last received RTP packet is below a predetermined threshold size, and the information received about the output data type indicates that the type of audio data contained in the last received RTP packet is comfort noise data generated by the jitter buffer according to a packet loss concealment algorithm; and
    categorizing the RTP packet stream as alive if the elapsed time period is greater than the time interval selected for determining the status of the RTP packet stream, the payload size of the last received RTP packet is below the predetermined threshold size, and the information received about the output data type indicates that the type of audio data contained in the last received RTP packet is comfort noise data generated at an encoder and received at the jitter buffer in at least one comfort noise packet.

14. The method of claim 13, wherein the steps form a sequence performed at regular time intervals.

15. The method of claim 13, further comprising categorizing the RTP packet stream as alive if the elapsed time period is shorter than the selected time interval.

16. The method of claim 13, further comprising the step of determining if an RTP control protocol (RTCP) packet has been received within a predetermined period of time.

17. The method of claim 16, further comprising categorizing the RTP packet stream as dead if it is determined that no RTCP packet has been received within the predetermined period of time and the elapsed time period is greater than the selected time interval.

18. The method of claim 16, wherein said predetermined period of time is at least 8 seconds, preferably about 12 seconds.

19. The method of claim 13, wherein the time interval selected for determining the status of the RTP packet stream is about 1000 milliseconds.

20. The method of claim 13, further comprising categorizing the RTP packet stream as alive if the elapsed time period is greater than the time interval selected for determining the status of the RTP packet stream, the payload size of the last received RTP packet is below the predetermined threshold size, and the information received about the output data type indicates that the type of audio data contained in the last received RTP packet is speech data.

21. The method of claim 13, wherein the step of determining the payload size of the last received RTP packet is performed only if the elapsed time period is determined to be greater than the time interval selected for determining the status of the RTP packet stream.

22. The method of claim 13, wherein the predetermined threshold is 10 bytes.

23. The method of claim 13, further comprising categorizing the RTP packet stream as dead if the elapsed time period is greater than the time interval selected for determining the status of the RTP packet stream and the payload size of the last received RTP packet exceeds said predetermined threshold size.

24. A non-transitory computer readable medium having computer executable instructions for carrying out each of the steps of the method as claimed in claim 13.

25. A method for determining a status of a real-time transfer protocol (RTP) packet stream at a receiver, said method comprising:
    determining a time period elapsed since reception of the last RTP packet at the receiver;
    determining a payload size of the last received RTP packet;
    determining an output data type of audio data output from a jitter buffer of the receiver, the output data type being determined only when the elapsed time period is greater than a time interval selected for determining the status of the RTP packet stream and the payload size of the last received RTP packet is below a predetermined threshold size;
    categorizing the RTP packet stream as dead if the elapsed time period is greater than the time interval selected for determining the status of the RTP packet stream, the payload size of the last received RTP packet is below the predetermined threshold size, and the output data type is determined to be comfort noise data generated by the jitter buffer according to a packet loss concealment algorithm; and
    categorizing the RTP packet stream as alive if the elapsed time period is greater than the time interval selected for determining the status of the RTP packet stream, the payload size of the last received RTP packet is below the predetermined threshold size, and the output data type is determined to be comfort noise data generated at an encoder and received at the jitter buffer in at least one comfort noise packet.

26. The method of claim 25, wherein the steps form a sequence performed at regular time intervals.

27. The method of claim 25, further comprising categorizing the RTP packet stream as alive if the elapsed time period is greater than the time interval selected for determining the status of the RTP packet stream, the payload size of the last received RTP packet is below the predetermined threshold size, and the output data type is determined to be speech data.

28. The method of claim 25, further comprising categorizing the RTP packet stream as alive if the elapsed time period is shorter than the selected time interval.

29. The method of claim 25, further comprising the step of determining if an RTP control protocol (RTCP) packet has been received within a predetermined period of time.

30. The method of claim 29, further comprising categorizing the RTP packet stream as dead if it is determined that no RTCP packet has been received within the predetermined period of time and the elapsed time period is greater than the selected time interval.

31. The method of claim 29, wherein said predetermined period of time is at least 8 seconds, preferably about 12 seconds.

32. The method of claim 25, wherein the predetermined threshold size is 10 bytes.

33. The method of claim 25, further comprising categorizing the RTP packet stream as dead if the elapsed time period is greater than the time interval selected for determining the status of the RTP packet stream and the payload size of the last received RTP packet exceeds the predetermined threshold size.

34. The method of claim 25, wherein the time interval selected for determining the status of the RTP packet stream is about 1000 milliseconds.

35. A non-transitory computer readable medium having computer executable instructions for carrying out each of the steps of the method as claimed of claim 25.

* * * * *